United States Patent
Lee et al.

(10) Patent No.: US 8,206,868 B2
(45) Date of Patent: Jun. 26, 2012

(54) DIRECT LIQUID FEED FUEL CELL SYSTEM HAVING DOUBLE FUEL STORAGE

(75) Inventors: Jae-yong Lee, Seongnam-si (KR);
Hye-jung Cho, Anyang-si (KR);
Kyoung Hwan Choi, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1119 days.

(21) Appl. No.: 11/498,134

(22) Filed: Aug. 3, 2006

(65) Prior Publication Data

US 2007/0122673 A1        May 31, 2007

(30) Foreign Application Priority Data

Nov. 2, 2005   (KR) ............... 10-2005-0104147

(51) Int. Cl.
*H01M 8/04* (2006.01)
(52) U.S. Cl. ......... 429/448; 429/427; 429/512; 429/515
(58) Field of Classification Search .................. None
See application file for complete search history.

(56) References Cited

U.S. PATENT DOCUMENTS

| | | | |
|---|---|---|---|
| 6,981,877 B2 | 1/2006 | Ren et al. | |
| 7,074,511 B2* | 7/2006 | Becerra et al. | 429/34 |
| 7,175,934 B2* | 2/2007 | DeFilippis et al. | 429/34 |
| 7,625,655 B1 | 12/2009 | Becerra et al. | |
| 2003/0198853 A1* | 10/2003 | Choi et al. | 429/32 |
| 2004/0115506 A1 | 6/2004 | Miyazaki et al. | |
| 2004/0202906 A1 | 10/2004 | Kim et al. | |
| 2006/0003196 A1* | 1/2006 | Kohno et al. | 429/12 |
| 2006/0292412 A1* | 12/2006 | Faghri et al. | 429/26 |

FOREIGN PATENT DOCUMENTS

| | | |
|---|---|---|
| CN | 1536701 | 10/2004 |
| CN | 1685550 | 10/2005 |
| JP | 2004-164954 | 6/2004 |
| JP | 2005-093124 | 4/2005 |
| KR | 10-2004-0045312 | 6/2004 |
| WO | WO 2004/030134 | 4/2004 |
| WO | WO 2005/045975 | 5/2005 |
| WO | WO 2005/055352 | 6/2005 |

OTHER PUBLICATIONS

Japanese Office Action issued Apr. 6, 2010, in corresponding Japanese Patent Application No. 2006-202177.

* cited by examiner

*Primary Examiner* — Cynthia Lee
(74) *Attorney, Agent, or Firm* — Lee & Morse, P.C.

(57) ABSTRACT

A direct liquid feed fuel cell system includes fuel cells including an electrolyte membrane, a plurality of cathode electrodes formed on a first surface of the electrolyte membrane, and anode electrodes formed on a second part of the electrolyte membrane; and a high concentration fuel storage unit and a low concentration fuel storage unit which are separated from each other and store a liquid fuel to be supplied to the fuel cell. The liquid fuel in the low concentration fuel storage unit is supplied to the anode electrodes wherein the liquid fuel in the low concentration fuel storage unit is supplied to the anode electrodes when pressure is applied to the low concentration fuel storage unit, such as when the direct liquid feed fuel cell system having the low concentration fuel storage unit is mounted on an electronic device.

14 Claims, 4 Drawing Sheets

DIRECT LIQUID FEED FUEL CELL SYSTEM HAVING DOUBLE FUEL STORAGE

CROSS-REFERENCE TO RELATED APPLICATION

This application claims the benefit of Korean Patent Application No. 2005-104147, filed on Nov. 2, 2005, in the Korean Intellectual Property Office, the disclosure of which is incorporated herein in its entirety by reference.

BACKGROUND OF THE INVENTION

1. Field of the Invention

Aspects of the present invention relate to a direct liquid feed fuel cell system, and more particularly, to a direct liquid feed fuel cell system including a high concentration fuel storage unit and a low concentration fuel storage unit.

2. Description of the Related Art

A fuel cell is an electrochemical apparatus that directly transforms chemical energy of a fuel into electrical energy. A direct liquid feed fuel cell generates electricity through an electrochemical reaction between a liquid fuel, such as methanol, and oxygen. A direct liquid feed fuel cell is different from a secondary cell in that the direct liquid feed fuel cell can be operated as long as fuel is supplied from the outside.

A direct liquid feed fuel cell can be directly mounted in a mobile communication device or can be used to charge a rechargeable battery mounted in a mobile communication device.

To use a direct liquid feed fuel cell as a power source of a mobile communication device for a prolonged period of time, low concentration methanol is supplied to an electrode after mixing pure methanol or high concentration methanol with water. Accordingly, the direct liquid feed fuel cell for a mobile communication device requires a high concentration fuel storage. To dilute the high concentration methanol, water is required at the start-up stage of the fuel cell. Thereafter, water to dilute the high concentration methanol is produced by the normal operation of the fuel cell. It takes at least a few minutes to produce enough water in the direct liquid feed fuel cell system through the normal operation to be able to supply low concentration methanol to the electrode. Therefore, at a start-up stage, to minimize the start-up time, the direct liquid feed fuel cell should operate while low concentration methanol is supplied to an electrode diffusion layer. Afterwards, when the direct liquid feed fuel cell operates normally, high concentration methanol may be used as the source of fuel for the fuel cell.

Accordingly, a direct liquid feed fuel cell system having high and low concentration fuel storage units is desirable to supply power to a small mobile communication device.

SUMMARY OF THE INVENTION

Aspects of the present invention provide a direct liquid feed fuel cell system that includes both a low concentration fuel storage unit for quick and stable start-up and a high concentration fuel storage unit for driving the direct liquid feed fuel cell for a prolonged period of time. The direct liquid feed fuel cell system can have a small volume when mounted on an electronic device.

According to an aspect of the present invention, there is provided a direct liquid feed fuel cell system comprising: a plurality of fuel cells including: an electrolyte membrane; a plurality of cathode electrodes formed on a first surface of the electrolyte membrane; and anode electrodes formed on second surface of the electrolyte membrane; and a high concentration fuel storage unit and a low concentration fuel storage unit which are separated from each other and store a liquid fuel to be supplied to the fuel cell, wherein the liquid fuel in the low concentration fuel storage unit is selectively supplied to the anode electrodes, such as, for example, when the direct liquid feed fuel cell system having the low concentration fuel storage unit is mounted on an electronic device.

According to an aspect of the present invention, the low concentration fuel storage unit may be a flexible container.

According to an aspect of the present invention, the low concentration fuel storage unit may store water or 3 moles or less of methanol.

According to an aspect of the present invention, the low concentration fuel storage unit may store 1 to 3 moles of methanol.

According to an aspect of the present invention, the direct liquid feed fuel cell system may further comprise a fuel diffusion unit mounted on the anode electrodes, wherein the high concentration fuel storage unit is disposed on the fuel diffusion unit.

According to an aspect of the present invention, the fuel diffusion unit may be a porous foam member.

According to an aspect of the present invention, the low concentration fuel storage unit may be disposed on the high concentration fuel storage unit, and an outlet of the low concentration fuel storage unit may contact the fuel diffusion unit.

According to an aspect of the present invention, the high concentration fuel storage unit may have a through hole through which the outlet of the low concentration fuel storage unit contacts the fuel diffusion unit.

According to an aspect of the present invention, the direct liquid feed fuel cell system may further comprise a housing in which the fuel cell, the fuel diffusion unit, and the high concentration fuel storage unit are mounted, wherein the low concentration fuel storage unit is detachably mounted on the housing.

According to an aspect of the present invention, the direct liquid feed fuel cell system may further comprise a gas-permeable membrane between the fuel cell and the housing that prevents water produced at the cathode electrodes from leaking to the outside and allows gas to pass.

According to another aspect of the present invention, there is provided a method of operating a direct liquid feel fuel cell system, wherein the direct liquid feel fuel cell system comprises a plurality of fuel cells including an electrolyte membrane; a plurality of cathode electrodes formed on a first surface of the electrolyte membrane; a plurality of anode electrodes formed on a second surface of the electrolyte membrane; the method comprising: providing a high concentration fuel storage unit and a low concentration fuel storage unit that are separated from each other and store a liquid fuel to be supplied to the fuel cells; supplying liquid fuel from the low concentration fuel storage unit at start-up of the fuel cells and thereafter, supplying liquid fuel from the high concentration fuel storage unit.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
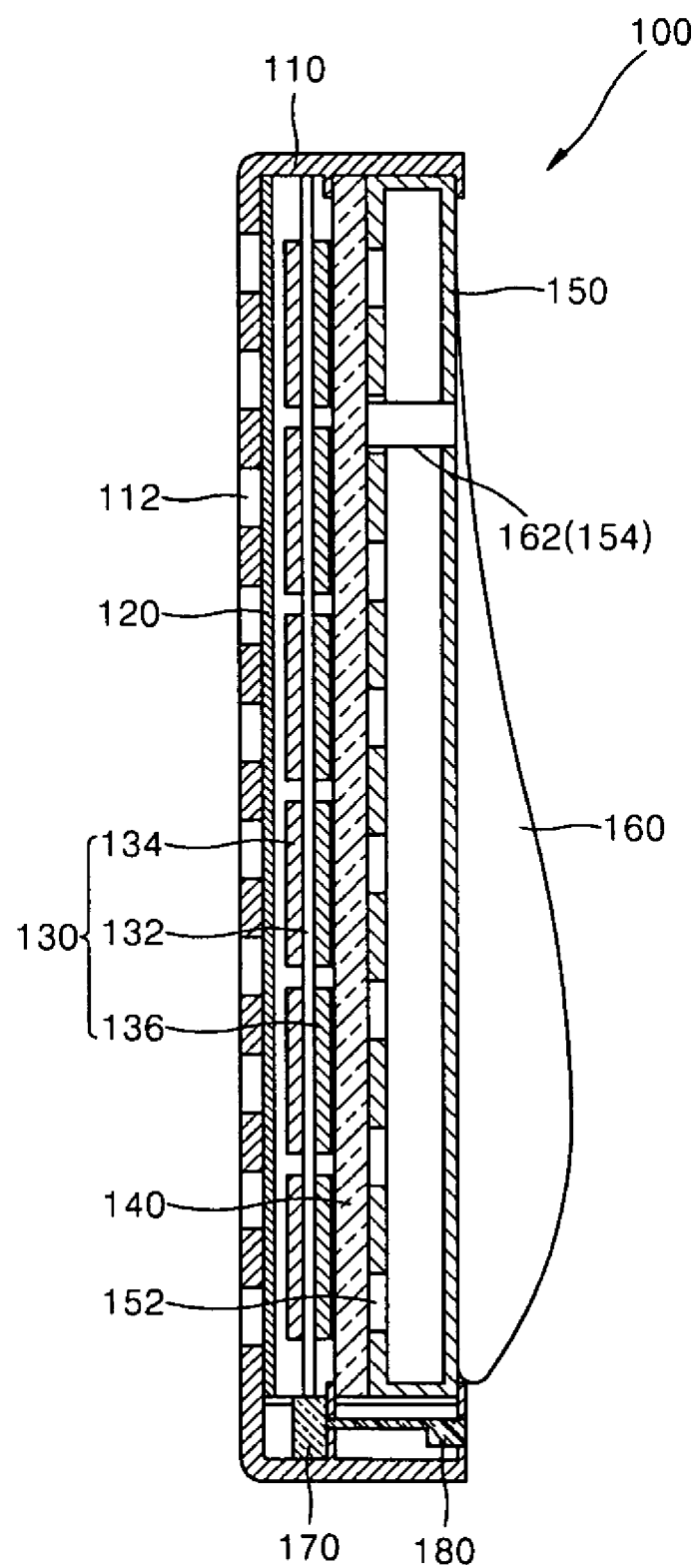
FIG. 1 is a cross-sectional view of a direct liquid feed fuel cell system according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a cross-sectional view of a direct liquid feed fuel cell system 100 according to an embodiment of the present invention. The direct liquid feed fuel cell system 100 includes a housing 110, a plurality of fuel cells 130, a fuel diffusion unit 140 on anode electrodes 136 of the fuel cells 130, a high concentration fuel storage unit 150 disposed on the fuel diffusion unit 140, and a low concentration fuel storage unit 160 disposed on the high concentration fuel storage unit 150. The fuel cell 130, the fuel diffusion unit 140, and the high concentration fuel storage unit 150 can be fixedly mounted in the housing 110. The low concentration fuel storage unit 160 can be detachable from the housing 110.

The direct liquid feed fuel cell system 100 includes an electrolyte membrane 132, a plurality of cathode electrodes 134 formed on a first surface of the electrolyte membrane 132, and a plurality of anode electrodes 136 corresponding to the cathode electrodes 134 formed on a second surface of the electrolyte membrane 132. The fuel cells 130 are connected in series. The method of connecting the fuel cells is well known in the art, and thus, a detailed description thereof will be omitted.

The fuel diffusion unit 140 uniformly distributes fuel received from the low concentration fuel storage unit 160 and fuel received from the high concentration fuel storage unit 150 onto the anode electrodes 136. The fuel diffusion unit 140 can be formed of a porous foam, such as sponge.

The high concentration fuel storage unit 150 stores a high concentration fuel, e.g., pure methanol, to increase the energy density of the direct liquid feed fuel cell system according to an aspect of the present embodiment. A plurality of holes 152 are formed in a wall of the high concentration fuel storage unit 150 contacting the fuel diffusion unit 140. The high concentration fuel is supplied to the anode electrodes 136 via the holes 152 of the high concentration fuel storage unit 150 through the fuel diffusion unit 140. The high concentration fuel storage unit 150 can be fixedly or detachably mounted in the housing 110. The high concentration fuel storage unit 150 includes a fuel inlet (not shown) through which pure methanol can be supplied from the outside.

Figure 2:
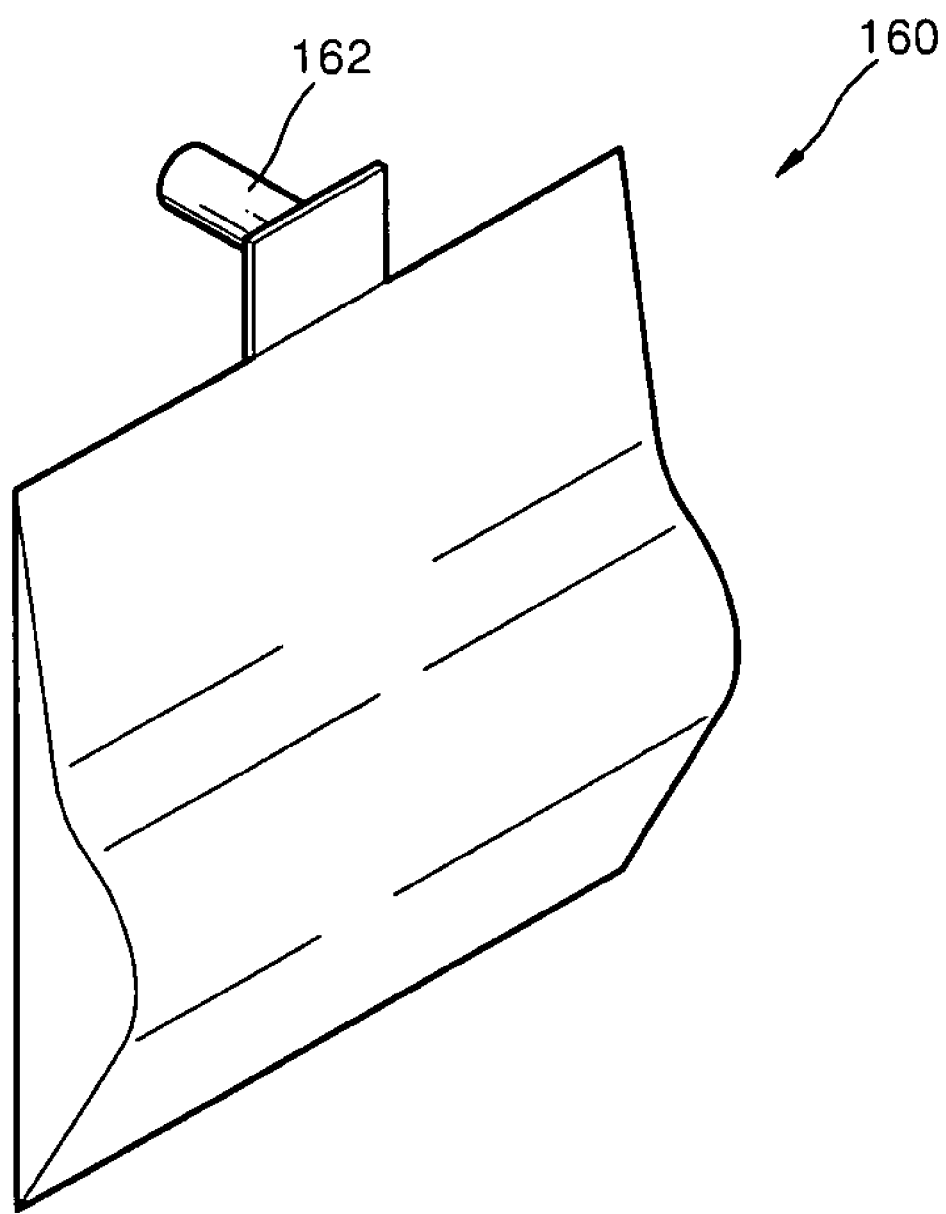
FIG. 2 is a perspective view of a low concentration fuel storage unit of the direct liquid feed fuel cell system of FIG. 1.
Figure 4:
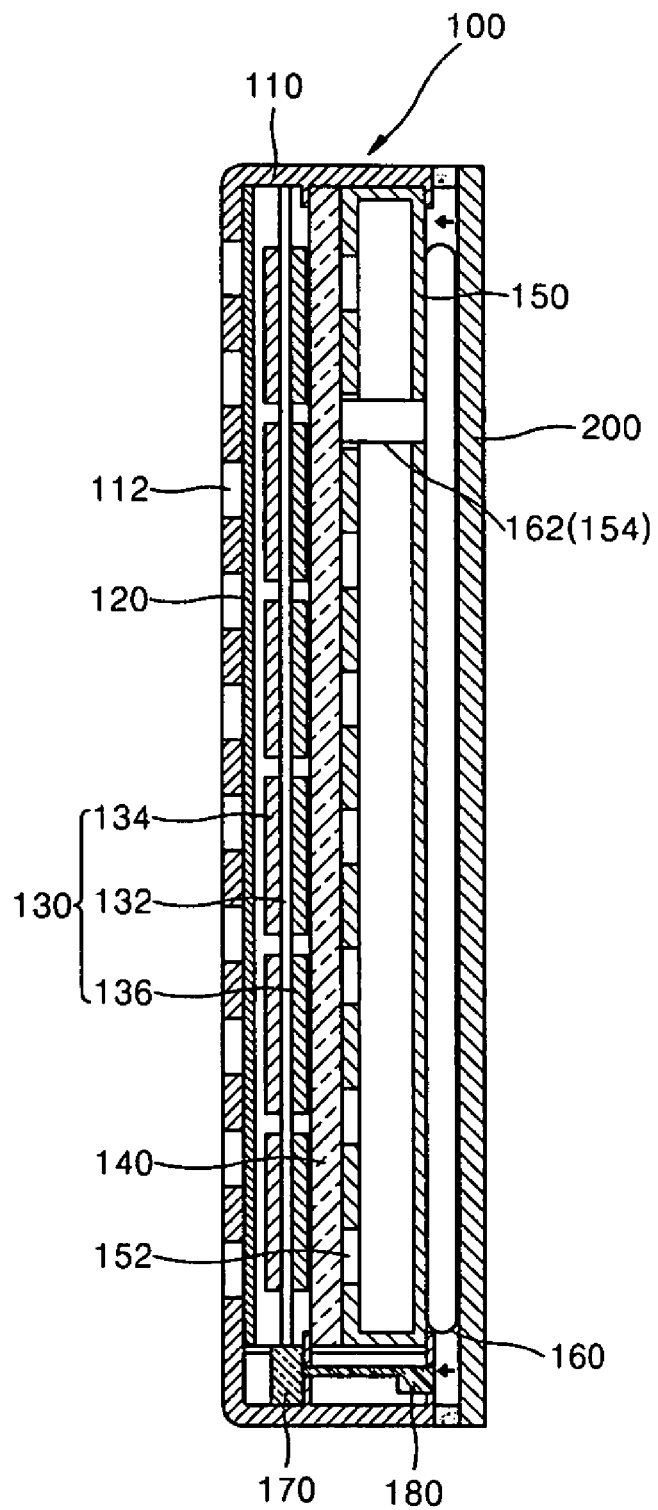
FIG. 4 is a cross-sectional view of a direct liquid feed fuel cell system with a schematic representation of an electronic device pressing against the low concentration fuel storage unit according to an embodiment of the present invention.

The low concentration fuel storage unit 160 is a flexible bag, and stores methanol required for starting up the direct liquid feed fuel cell. As a non-limiting example, the low concentration fuel storage unit 160 may store 1 to 3 moles of methanol. FIG. 2 is a perspective view of the low concentration fuel storage unit 160. Referring to FIG. 2, the low concentration fuel storage unit 160 includes a fuel outlet 162 through which the liquid fuel is outputted into the fuel diffusion unit 140 due to external pressure. The fuel outlet 162 contacts the fuel diffusion unit 140 via a through hole 154 formed in the high concentration fuel storage unit 150. The fuel outlet can be detached from the through hole 154, so that the low concentration fuel storage unit 160 can be detached from the direct liquid feed fuel cell system 100. The volume of the low concentration fuel storage unit 160 can be reduced by applying external pressure. For example, pressure may be created when the low concentration fuel storage unit 160 is pressed between the housing 100 and an electronic device 200, as shown in FIG. 4. In FIG. 4, arrows are shown at upper and lower portions of the electronic device 200. The arrows point toward the housing 100. The low fuel concentration fuel storage unit may be pressed between the housing 110 and the electronic device 200. Accordingly, the low concentration fuel storage unit 160 can occupy a small volume in the direct liquid feed fuel cell system 100 when the direct liquid feed fuel cell system 100 is mounted on the electronic device 200.

As used herein, the terms "low concentration fuel" and "high concentration fuel" are not critical. As a general principle, the term "low concentration fuel" refers to a fuel that contains a sufficient amount of water to provide an anode reaction at the start-up of the fuel cell. For example, in a direct methanol fuel cell (DMFC), methanol reacts with water in equal molar amounts at the anode to produce $CO_2$, hydrogen ions and electrons. Therefore, in a DMFC, sufficient water should be present in the low concentration fuel to allow the anode reaction to take place. Thereafter, the hydrogen ions and electrons produced at the anode react with oxygen at the cathode to produce water so that once the operation of the fuel cell is underway, an extrinsic source of water is less necessary and high concentration fuel may be supplied to the anode to mix with water that is routed from the cathode. Accordingly, the term "high concentration fuel" refers to fuel that contains less water than the low concentration fuel. As used herein, the term "start-up" refers to any commencement of operation of a fuel cell that has been idle for a period of time. For example, a fuel cell may be idle for a period of time such that water generated from previous operations of the fuel cell is no longer present at the anode.

A printed circuit substrate 170 can be mounted to a side of the direct liquid feed fuel cell system 100. The printed circuit substrate 170 is electrically connected to a terminal (not shown) of the fuel cells 130 and is connected to an external terminal 180 for charging a mobile electronic device (not shown).

A plurality of air holes 112 are formed in the surface of the housing 110 facing the cathode electrodes 134 of the fuel cell 130. Air is supplied to the cathode electrodes 134 through the air holes 112. A gas-permeable membrane 120 can be formed between the air holes 112 and the fuel cell 130. The gas-permeable membrane 120 can be formed of hydrophobic and porous polytetrafluoroethylene (PTFE). The gas-permeable membrane 120 prevents water produced at the cathode electrodes 134 from leaking to the outside and allows the water to be recovered and used at the anode electrodes 136. The gas-permeable membrane 120 also allows carbon dioxide produced by the fuel cells 130 to be discharged to the outside.

In the present embodiment, 1 to 3 moles of methanol is stored in the low concentration fuel storage unit 160, but the present invention is not limited thereto. That is, amount of methanol may be greater or lesser than 1 to 3 moles and the low concentration fuel storage unit 160 can store only water. In this case, at start-up, the water is supplied to the fuel diffusion unit 140 to mix with the high concentration fuel received from the high concentration fuel storage unit 150.

The operation of the direct liquid feed fuel cell system according to an embodiment of the present invention will now be described with reference to FIGS. 1, 2, and 4.

First, pure methanol or high concentration methanol is filled in the high concentration fuel storage unit 150 mounted in the housing 110 and low concentration methanol is filled in the low concentration fuel storage unit 160. As a non-limiting example, the high concentration fuel storage unit 150 may be filled with more than 10 moles of pure methanol or high concentration methanol, and the low concentration storage unit may be filled with 1 to 3 moles of methanol at a low concentration. The outlet 162 of the low concentration fuel storage unit 160 is inserted into the through hole 154 of the high concentration fuel storage unit 150 to mount the low concentration fuel storage unit 160 onto the housing 110. Next, an external terminal (not shown) of an electronic device 200 to be charged is coupled to the external terminal 180. Low concentration methanol from the low concentration fuel storage unit 160 is supplied to the fuel diffusion unit 140 through the outlet 162 by the pressure created when the low concentration fuel storage unit 160 is pressed between the housing 110 and the electronic device 200. Thus, the fuel cell 130 starts operating. After the start-up stage is completed, the high concentration fuel in the high concentration fuel storage unit 150 is supplied to the fuel diffusion unit 140 through the holes 152. At this time, at least some of the water produced at the cathode electrodes 134 is prevented from going outside and is recovered by the gas-permeable membrane 120 and directed to the fuel diffusion unit 140 to dilute the high concentration fuel. Accordingly, the direct liquid feed fuel cell system according to an embodiment of the present invention uses the low concentration fuel at the start-up stage and uses the high concentration fuel during normal operation.

When the high concentration fuel is exhausted, the direct liquid feed fuel cell system can be restarted in a short time, either by replacing the high concentration fuel storage unit 150 with another high concentration fuel storage unit 150 filled with the high concentration fuel or by re-filling the high concentration fuel storage unit 150 with the high concentration fuel. When the direct liquid feed fuel cell system is restarted after being stopped for a prolonged period of time, the direct liquid feed fuel cell system is operated by mounting the new low concentration fuel storage unit 160 in the housing 110 so that the fuel cells 130 are supplied with low concentration fuel at start-up.

Figure 3:
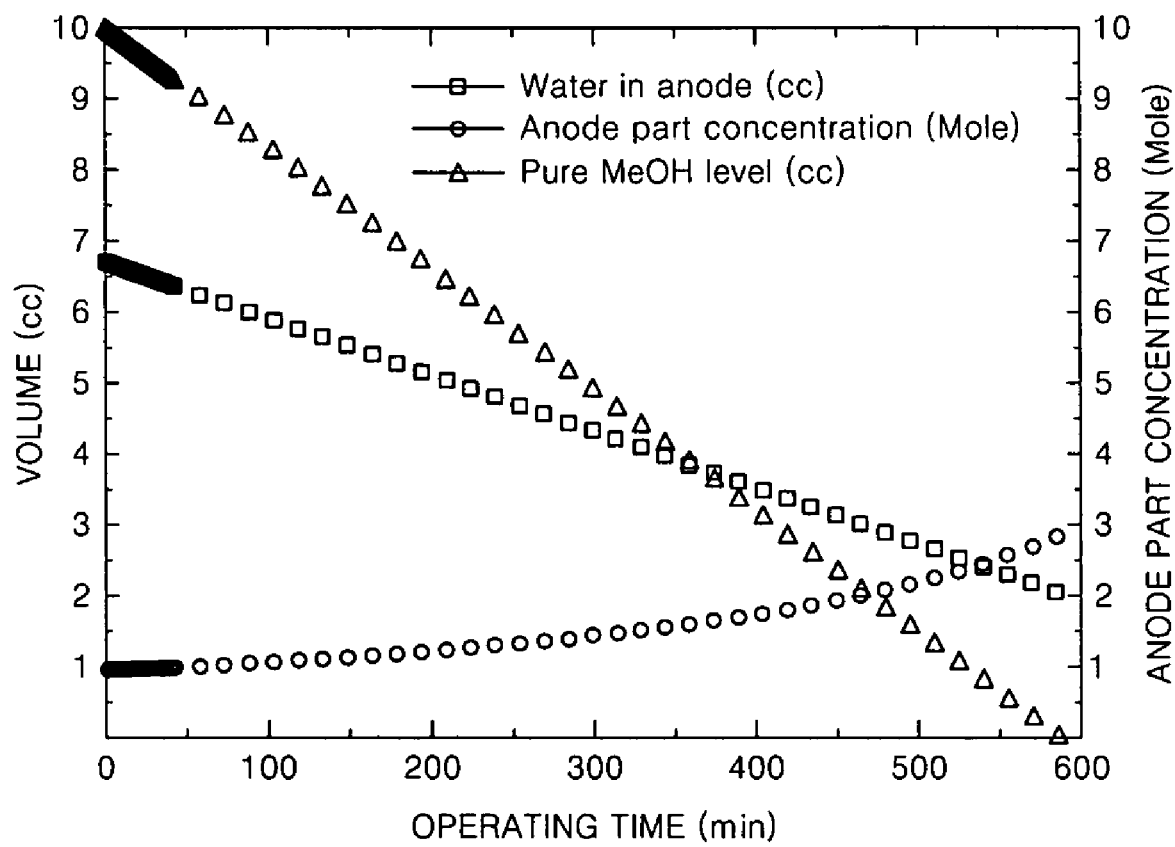
FIG. 3 is a graph showing a simulation result of an operation of a direct liquid feed fuel cell system according to an embodiment of the present invention.

FIG. 3 is a graph showing simulation results of an operation of a direct liquid feed fuel cell system according to an embodiment of the present invention. In the simulation, the power output density of the fuel cell was 40 mW/cm$^2$, the total power output was 1200 mW, and the liquid fuel supplied from a low concentration fuel storage unit to a fuel diffusion unit was 7 cc of 1 molar methanol. 10 cc of pure methanol was stored in a high concentration fuel storage unit.

Referring to FIG. 3, when water crossover from the anode side is offset by the recovery of water from the cathode side, water in the anode side supplied from the low concentration fuel storage unit is mixed with the pure methanol supplied from the high concentration fuel storage unit. At this time, the concentration of methanol in the anode side gradually rises, but is maintained at approximately 3 moles after the high concentration fuel from the high concentration fuel storage unit is exhausted. Accordingly, the direct liquid feed fuel cell according to an embodiment of the present invention operated for approximately 600 minutes before the fuel was exhausted.

The direct liquid feed fuel cell according to an aspect of the present invention can effectively start operating using a low concentration fuel required for start-up, and can be operated for a prolonged period of time using a high concentration fuel.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A direct liquid feed fuel cell system comprising:
   a plurality of fuel cells including:
      an electrolyte membrane;
      a plurality of cathode electrodes on a first surface of the electrolyte membrane; and
      a plurality of anode electrodes on a second surface of the electrolyte membrane;
   a fuel diffusion unit disposed on the anode electrodes;
   a high concentration fuel storage unit in communication with the fuel diffusion unit, wherein the high concentration fuel storage unit stores a high concentration liquid fuel and includes a plurality of holes through which the high concentration liquid fuel is passively supplied to the fuel diffusion unit; and
   a low concentration fuel storage unit in communication with the fuel diffusion unit through a through-hole in the high concentration fuel storage unit, wherein the low concentration fuel storage unit stores a low concentration liquid fuel separately from the high concentration fuel storage unit and supplies the low concentration liquid fuel directly to the fuel diffusion unit when pressure is applied to the low concentration fuel storage unit.

2. The direct liquid feed fuel cell system of claim 1, wherein the low concentration fuel storage unit is a flexible container.

3. The direct liquid feed fuel cell system of claim 1, wherein the low concentration fuel storage unit stores water or stores a mixture of water and methanol wherein the amount of methanol in the mixture is 3 moles or less.

4. The direct liquid feed fuel cell system of claim 3, wherein the low concentration fuel storage unit stores a mixture of water and methanol wherein the amount of methanol in the mixture is 1 to 3 moles.

5. The direct liquid feed fuel cell system of claim 1, wherein the fuel diffusion unit is a porous foam member.

6. The direct liquid feed fuel cell system of claim 1, wherein the low concentration fuel storage unit is disposed on the high concentration fuel storage unit, and wherein an outlet of the low concentration fuel storage unit contacts the fuel diffusion unit.

7. The direct liquid feed fuel cell system of claim 6, wherein the high concentration fuel storage unit has a through hole through which the outlet of the low concentration fuel storage unit contacts the fuel diffusion unit.

8. The direct liquid feed fuel cell system of claim 1, further comprising a housing in which the plurality of fuel cells, the fuel diffusion unit, and the high concentration fuel storage unit are mounted, wherein the low concentration fuel storage unit is detachably mounted on the housing.

9. The direct liquid feed fuel cell system of claim 8, further comprising a gas-permeable membrane between the fuel cell and the housing that prevents water produced at the cathode electrodes from leaking to the outside and allows gas to pass though the membrane.

10. The direct liquid feed fuel cell system of claim 1, wherein the high concentration fuel storage unit stores pure methanol or more than 10 moles of high concentration methanol.

11. A method of operating a direct liquid feed fuel cell system that includes: a plurality of fuel cells, the plurality of fuel cells including an electrolyte membrane, a plurality of cathode electrodes on a first surface of the electrolyte membrane, and a plurality of anode electrodes on a second surface of the electrolyte membrane; and a fuel diffusion unit disposed on the anode electrodes, the method comprising:

supplying a low concentration liquid fuel from a low concentration fuel storage unit through a through-hole in the high concentration fuel storage unit directly to the fuel diffusion unit at start-up of the fuel cells by applying pressure to the low concentration fuel storage unit; and passively supplying a high concentration liquid fuel through a plurality of holes of a high concentration fuel storage unit to the fuel diffusion unit, wherein the low concentration liquid fuel is stored separately from the high concentration fuel storage unit.

12. The method of claim 11, wherein the low concentration fuel storage unit is a flexible container.

13. The method of claim 11, wherein the pressure is applied to the low concentration fuel storage unit by mounting an electronic device on the direct liquid feed fuel cell system such that the electronic device presses against the low concentration fuel storage unit.

14. The method of claim 11, wherein the direct liquid feed fuel cell system further includes a housing in which the plurality of fuel cells, the fuel diffusion unit, and the high concentration fuel storage unit are mounted, the method further comprising providing applying pressure to the low concentration fuel storage unit by coupling an electronic device to the housing such that the electronic device presses against the low concentration fuel storage unit.

* * * * *